C. RADIGUER.
AUTOMOBILE TORPEDO.
APPLICATION FILED OCT. 31, 1918.

1,334,401.

Patented Mar. 23, 1920.
2 SHEETS—SHEET 1.

Inventor.
Charles Radiguer
By Henri Goldsbrough & O'Neill
Attys

C. RADIGUER.
AUTOMOBILE TORPEDO.
APPLICATION FILED OCT. 31, 1918.
1,334,401.
Patented Mar. 23, 1920.
2 SHEETS—SHEET 2.
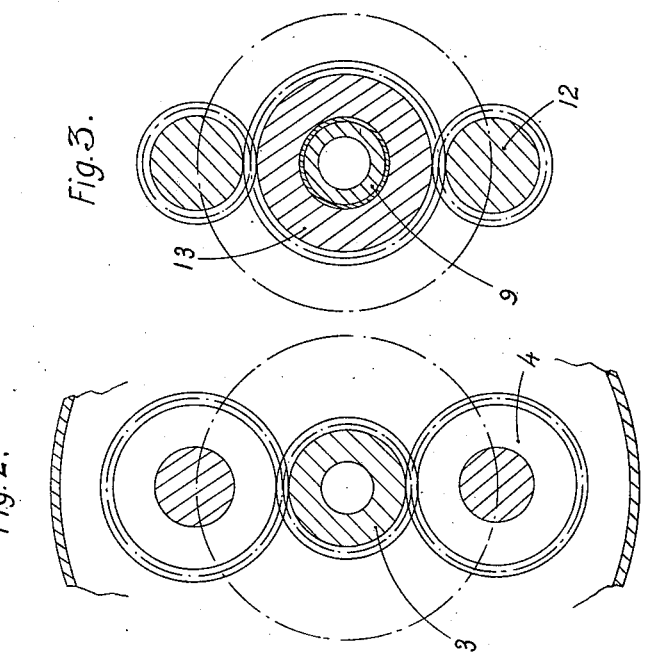
Inventor.

UNITED STATES PATENT OFFICE.

CHARLES RADIGUER, OF PARIS, FRANCE, ASSIGNOR TO SOCIÉTÉ ANONYME DES ETABLISSEMENTS DELAUNAY BELLEVILLE, OF ST.-DENIS, SEINE, FRANCE, A CORPORATION OF FRANCE.

AUTOMOBILE TORPEDO.

1,334,401.          Specification of Letters Patent.      Patented Mar. 23, 1920.

Application filed October 31, 1918. Serial No. 260,606.

*To all whom it may concern:*

Be it known that I, CHARLES RADIGUER, of 5 Avenue Franco-Russe, at Paris, Department of the Seine, in France, citizen of the French Republic, have invented certain new and useful Improvements in Automobile Torpedoes; and I do hereby declare the following to be a full, clear, and exact description of the invention, such as will enable others skilled in the art to which it appertains to make and use the same.

In automobile torpedoes driven by turbines, the necessity for keeping the efficiency of the turbine favorable leads to adopting a high angular velocity and consequently to interposing between the turbine and the propeller shafts a speed-reducing device having a high ratio of reduction.

The object of the present invention is to use a driving turbine and epicyclic reducing gear driving the propeller shafts of an automobile torpedo in opposite directions and at the same number of revolutions.

The accompanying drawings illustrate two of the constructional forms of the turbine and reducing gearing.

Fig. 2 is a section on 2—2 of Fig. 1;

Fig. 3 is a section on 3—3 of Fig. 1.

Figure 1:
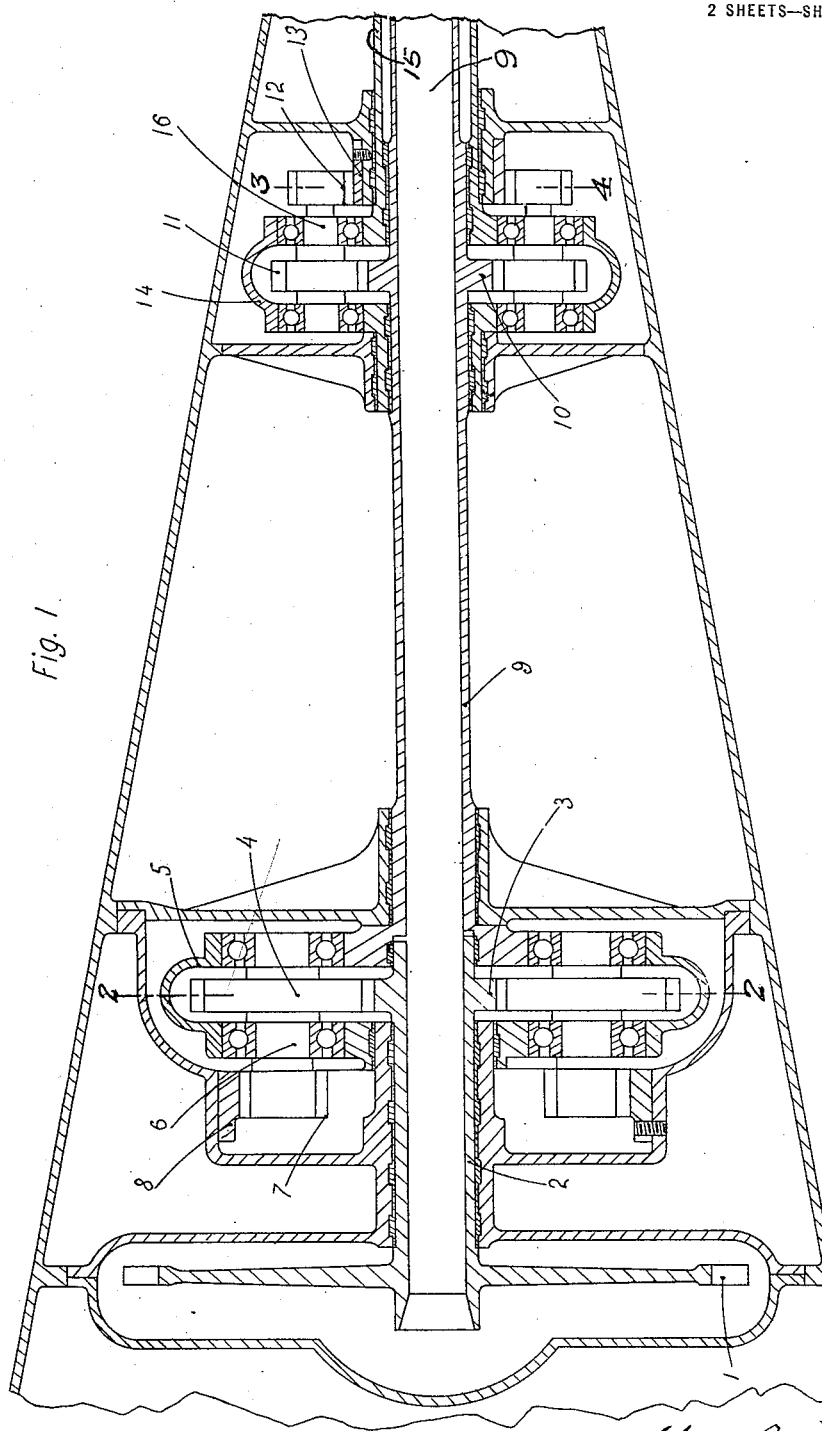
Figure 1 is a longitudinal section.

Referring first to Figs. 1-4, the motor turbine 1, consisting generally of a single disk, is actuated by the gaseous jets coming from expansion nozzles not shown in the drawing. The driving shaft, virtually integral with the wheel 1, is hollow for the purpose of allowing the expanded fluid to escape. A pinion 3, situated at the other end of the shaft, gears with one or more pinions such as 4. The shaft 6, carrying the toothed wheel 4, is pivoted in a frame 5 which can rotate about the same shaft as the turbine. The shafts 6 and 16 carry two pinions 7 and 12 respectively, of which one, 7, gears with a fixed rim 8, while the other, 12, gears with a toothed rim 13, virtually integral with the external propeller shaft 15. These two rims, which are shown in the drawing toothed externally, may be toothed internally instead.

The frame 5 is virtually integral with the central propeller shaft 9.

The rotation of the turbine occasions that of the frame 5 and that of the shafts 9 and 15, and by judiciously arranging the ratios of the numbers of teeth in the gear wheels 8 and 7, 13 and 12, the shafts 9 and 15 are rotated in opposite directions and at the same angular velocity.

The figures show the combination of a turbine and two epicyclic trains. One of the speed-reducers, coupled directly to the turbine, gives the final motion to the central propeller shaft. The second train works as a transformer and rotates the external propeller shaft.

Referring now to the figures of the drawings, as previously described, the turbine 1 actuates a pinion 3 keyed on to the end of the shaft 2. The pinion 3 gears with one or more epicyclic pinions such as 4, but the shaft 6 pivoted in the rotatable frame 5 only comprises a single pinion 7 gearing with an internally toothed rim 8 rigidly fixed to the casing of the turbine. This rim might equally well be toothed externally. The frame 5 is virtually integral with the central shaft 9, and the rotation of the turbine brings about that of 5 and 9.

To the shaft 9 is keyed a toothed wheel 10 gearing with one or more epicyclic pinions 11 mounted in a rotatable frame 14 virtually integral with the external shaft 15. On the shaft of the epicyclic pinion is a pinion 12 gearing with an externally toothed rim 13 rigidly fixed to the torpedo.

By arranging the numbers of teeth in the toothed wheels 10, 11, 12 and 13 the rotation of 14 and 15 is obtained at the same number of revolutions as the shaft 9 and in the opposite direction.

I claim:

1. In an automobile torpedo, the combination with a pair of concentric propeller shafts, of a driving member therefor, and an epicyclic speed reducing train of gears arranged between the driving member and one of said shafts and a second epicyclic speed reducing train of gears arranged between the first shaft and the second shaft, so that the shafts will rotate in opposite directions at the same angular velocity.

2. In an automobile torpedo, the combination of a pair of concentric propeller shafts, a driving member for one of the shafts, epicyclic gearing between said driving member and the adjacent shaft, and a second train of epicyclic gearing between said shafts.

3. In an automobile torpedo, the combination with a pair of concentric shafts, of a driving member for one of said shafts, epicyclic gearing between the driving member and the adjacent shaft, which gearing includes an internal toothed wheel, and a second train of epicyclic gearing between the two shafts, which last mentioned train includes an externally toothed wheel.

In testimony whereof I affix my signature.

CHARLES RADIGUER.